United States Patent
Sobota et al.

(10) Patent No.: US 10,696,556 B2
(45) Date of Patent: Jun. 30, 2020

(54) PREPARATION OF TRICHLOROSILANE

(71) Applicant: Wacker Chemie AG, Munich (DE)

(72) Inventors: Marek Sobota, Munich (DE); Anne Alber, Munich (DE)

(73) Assignee: WACKER CHEMIE AG, Munich (DE)

( * ) Notice: Subject to any disclaimer, the term of this patent is extended or adjusted under 35 U.S.C. 154(b) by 455 days.

(21) Appl. No.: 14/907,957

(22) PCT Filed: Jul. 22, 2014

(86) PCT No.: PCT/EP2014/065716
§ 371 (c)(1),
(2) Date: Jan. 27, 2016

(87) PCT Pub. No.: WO2015/014670
PCT Pub. Date: Feb. 5, 2015

(65) Prior Publication Data
US 2016/0176717 A1 Jun. 23, 2016

(30) Foreign Application Priority Data

Jul. 31, 2013 (DE) .................. 10 2013 215 011

(51) Int. Cl.
*C01B 33/107* (2006.01)
(52) U.S. Cl.
CPC .............................. *C01B 33/10763* (2013.01)
(58) Field of Classification Search
CPC .................................................... C01B 33/107
USPC .................................................. 423/341, 342
See application file for complete search history.

(56) References Cited

U.S. PATENT DOCUMENTS

| | | |
|---|---|---|
| 2,499,009 A | 2/1950 | Wagner |
| 4,092,446 A | 5/1978 | Padovani et al. |
| 4,986,971 A | 1/1991 | Forwald et al. |
| 5,334,738 A | 8/1994 | Pachaly et al. |
| 5,871,705 A | 2/1999 | Sakata et al. |
| 9,321,653 B2 | 4/2016 | Akiyoshi et al. |
| 2007/0245854 A1 | 10/2007 | Lynch et al. |
| 2007/0248521 A1* | 10/2007 | Kutsovsky ............. C01B 33/03 423/324 |
| 2009/0060818 A1 | 3/2009 | Bill, Jr. et al. |
| 2010/0051858 A1 | 3/2010 | Aramata et al. |
| 2012/0189501 A1* | 7/2012 | Gupta .................. C01B 33/027 422/139 |
| 2012/0260850 A1 | 10/2012 | Turenne et al. |
| 2012/0301385 A1* | 11/2012 | Akiyoshi ........... C01B 33/1071 423/342 |

FOREIGN PATENT DOCUMENTS

| | | |
|---|---|---|
| CN | 102753478 A | 10/2012 |
| DE | 197 40 923 A1 | 3/1998 |
| EP | 0 489 441 A1 | 6/1992 |
| GB | 1213845 A | 11/1970 |
| JP | 2006-100255 A | 4/2006 |
| TW | 201134765 A1 | 10/2011 |
| WO | 2005003030 A1 | 1/2005 |
| WO | 2006031120 A1 | 3/2006 |
| WO | 2012021064 A1 | 2/2012 |
| WO | 2012152434 A1 | 11/2012 |

OTHER PUBLICATIONS

Wakamatsu et al., Silicon for the Chemical Industry IV, "Study on Selectivity in Trichlorosilane Producing Reaction", Norway, Jun. 1998, pp. 12-132.
Brekken et al., Silicon for the Chemical Industry III, "Status After Having Granulated Silicon Metal for 30 Months," Norway, Jun. 1996, pp. 33-45.
Lobreyer et al., Silicon for the Chemical Industry, "Silicon for Trichlorosilane Production Basic Research and Development", Norwegian University of Science and Technology, Trondheim, No, Jun. 18, 1996, pp. 147-155, 1996, XP-002993832.
Samori et al., Silicon for the Chemical Industry, "Effect of Trace Elements in Metallurgical Silicon on Trichlorosilane Synthesis Reaction," Norwegian University of Science and Technology, Trondheim, No, Jun. 18, 1996, pp. 157-167, XP-002993831.
Deng, Chansheng: Solar Energy Principles and Applications, Beijing: Chemical Industry Press, p. 64, published on Jan. 31, 2010 and English Translation of cited contents of p. 64.

\* cited by examiner

*Primary Examiner* — Ngoc-Yen Nguyen
(74) *Attorney, Agent, or Firm* — Brooks Kushman P.C.

(57) ABSTRACT

The selectivity of a process for preparing trichlorosilane (TCS) by reaction of metallurgical silicon (mg-Si) and HCl, is improved by utilizing mg-Si having a titanium content greater than 0.06 wt %.

16 Claims, No Drawings

PREPARATION OF TRICHLOROSILANE

CROSS REFERENCE TO RELATED APPLICATIONS

This application is the U.S. National Phase of PCT Appln. No. PCT/EP2014/065716 filed Jul. 22, 2014, which claims priority to German Application No. 10 2013 215 011.3 filed Jul. 31, 2013, the disclosures of which are incorporated in their entirety by reference herein.

BACKGROUND OF THE INVENTION

1. Field of the Invention

The invention relates to a process for preparing trichlorosilane (TCS).

2. Description of the Related Art

Trichlorosilane is typically prepared from metallurgical silicon and hydrogen chloride in a fluidized-bed process. In order to manufacture high-purity trichlorosilane, a distillation follows.

U.S. Pat. No. 4,092,446 A discloses a reactor in which a stream of hydrogen chloride is charged through a silicon bed consisting of silicon particles. The hydrogen chloride reacts with the silicon particles to form silicon tetrachloride (STC), TCS and hydrogen.

Hydrogenation of STC to form TCS is likewise known. This is effected by reacting STC with hydrogen to form TCS and hydrogen chloride.

Most STC is generated in the course of polycrystalline silicon deposition. Polycrystalline silicon is manufactured by the Siemens process for example. This involves depositing silicon on heated thin rods in a reactor. The process gas used as the silicon-containing component is a halosilane such as TCS in the presence of hydrogen. As a result, it is possible to produce TCS from the STC by-produced in the deposition and to feed that TCS back to the deposition process in order to manufacture elemental silicon.

The selectivity of a chemical reaction indicates the proportion, taking account of the stoichiometry, of the total converted starting material that has been converted into the desired target product.

The conversion of metallurgical silicon (mg-Si) and HCl into TCS ($HSiCl_3$) co-generates hydrogen and by-products:

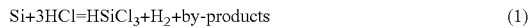

$$Si+3HCl=HSiCl_3+H_2+\text{by-products} \quad (1)$$

The amount of by-products formed in reaction (1) and, hence, the TCS selectivity, defined as the mole fraction TCS/(TCS+by-products), is influenced by various factors including, inter alia, the catalytic activity of impurities (admixed elements) in the mg-Si (metallurgical grade silicon) employed.

It is known that impurities in mg-Si or addition of a catalyst to mg-Si can influence the selectivity of the reaction. Some impurities have a positive influence and, hence, increase the selectivity. Other impurities, by contrast, have a negative influence. If the effect on selectivity of the individual admixed elements were known, the concentration of these elements could be specified for the mg-Si to be used in order to achieve optimal TCS selectivity.

US 20090060818 A1 claims a process for preparing TCS by reaction of silicon with HCl, or STC with hydrogen in the presence of silicon and catalysts. Catalysts used include, for example, Fe, Cu, Al, V, Sb and compounds thereof. Silicon and catalysts are laminated together and reduced in particle size prior to reaction. The direct contact between silicon and catalyst inter alia distinctly reduces the yield of by-products, thus increasing TCS selectivity.

EP 0489441 B1 claims a process for preparing silanes by reaction of HCl with silicon using a catalyst which increases the yield of STC. Useful catalysts include Sn, Ni, As, Pd, Rh, Pt, Ir, Al and compounds thereof.

U.S. Pat. No. 2,499,009 A discloses a process for preparing chlorosilanes with a high yield, about 20%, of DCS. In the first step, silicon is heated with Cu halide to give copper silicides which are then reacted with HCl to form chlorosilanes.

WO 2005003030 A1 discloses a process for preparing TCS by reaction of Si with HCl gas at a temperature of between 250 and 1100° C. and an absolute pressure of 0.5-30 atm in a moving-bed reactor, stirred-bed reactor or fixed-bed reactor, wherein the Si supplied to the reactor comprises between 30 and 10,000 ppm of Cr.

Using mg-Si having an enhanced Cr content should accordingly lead to high TCS selectivity.

WO 2012021064 A1 claims a process for preparing TCS by reaction of Si with HCl gas at a temperature of between 250 and 1100° C. and an absolute pressure of 0.5-30 atm in a moving-bed reactor, stirred-bed reactor or fixed-bed reactor, wherein the Si supplied to the reactor comprises between 40 and 10,000 ppm Ba and optionally between 40 and 10 000 ppm Cu. Using mg-Si having an enhanced Ba content leads to high TCS selectivity. TCS selectivity is further enhanced by addition of Cu.

U.S. Pat. No. 5,871,705 A proposes a process for preparing TCS by reaction of silicon with hydrogen chloride, which comprises contacting at least one silane compound selected from the group consisting of dichlorosilane (DCS), monochlorosilane (MCS) and monosilane with silicon during or prior to the reaction between silicon and hydrogen chloride. Silicon is thus contacted with a silane compound in order to remove the oxide layer on the silicon surface, thereby increasing the reactivity toward HCl. This document also discloses carrying out the reaction between the silicon and the hydrogen chloride in the presence of an alkali metal compound and a catalyst having catalytic activity for producing TCS from silicon and hydrogen chloride. This suppresses the reaction to form STC, thereby increasing TCS selectivity.

WO 2006031120 A1 describes a process for preparing TCS by reaction of Si with HCl gas at a temperature of between 250 and 1100° C. and a pressure of 0.1-30 atm in a moving-bed reactor, stirred-bed reactor or fixed-bed reactor, wherein the Si supplied to the reactor comprises less than 100 ppm of Mn. Using mg-Si comprising more than 100 ppm Mn or adding Mn into the reactor leads to lower reactivity and TCS selectivity.

Wakamatsu et al., Silicon for the Chemical Industry IV, 1998, 123-132, investigated the catalytic activity of selected admixed metals. Adding relatively large amounts of red phosphorus (200-2000 ppm) to mg-Si has a negative influence on TCS selectivity. This effect is further intensified by addition of $FeCl_2$.

WO 2012152434 A1 describes a process for producing spherical mg-Si particles having good properties for a subsequent TCS synthesis. The particles produced by atomizing molten mg-Si (possibly comprising intentional admixtures) have a mean particle size of from 20-425 μm. The concentration of the following admixed elements is specified: Cu (0.01-2 wt %), Al (≤1 wt %), Ca (≤0.02 wt %), C (<400 ppm), B (≤15 ppm) and P (≤15 ppm).

The prior art thus discloses that impurities in mg-Si or the addition of a catalyst to mg-Si can influence the selectivity of the reaction, in that a positive effect on TCS selectivity is reported for Cr, Ba and alkali metal compounds, while increased formation of by-products and, hence, a negative influence on TCS selectivity was observed inter alia with Mn, Ni, Cu and red phosphorus.

The concentration of impurities in mg-Si depends on the composition of the raw materials used (quartz sand, coal, coke, electrodes) and on the execution of the mg-Si production process and subsequent refining.

A large proportion of the impurities in mg-Si are present in intermetallic phases deposited at the interface between silicon grains during solidification of liquid mg-Si. The silicon grain size and the shape, size and distribution of the intermetallic phases depend on the solidification rate: a rapid cooling rate leads, compared to slow cooling, to the formation of smaller primary silicon grains having thinner and more evenly distributed intermetallic phases.

The distribution of the impurity phases between the silicon crystallites can be quantified, for example, by reference to the structural parameter QF defined in U.S. Pat. No. 5,334,738 A. This document describes a process for preparing methylchlorosilanes by direct synthesis, wherein the production rates of the individual methylchlorosilanes are controlled by using mg-Si having a particular structure (with regard to the shape of the intermetallic phases). To this end, a structural parameter QF is defined as the quotient of the total area of all intermetallic phases having a longitudinal shape and the total area of all intermetallic phases having a circular shape on the cut surface of a sample of silicon. The QF value depends on the solidification rate of the Si melt; slowly solidified Si has a low QF value while rapidly solidified Si exhibits a high QF value. Owing to its suitable structure, water-granulated silicon (i.e. generally silicon having a structural parameter QF of 18 to 60) is used in the process.

The mg-Si melt is typically cast into 10-40 cm thick ingots (slow cooling rate) and, once cooled, is crushed and screened.

GB 1213845 A discloses a process for casting ferroalloys, which comprises casting the molten alloy layer-by-layer into a casting mould (multilayer casting). Initially, the first layer of the ferroalloy is cast into a ground-level bed of granular material. This allows the layered ferroalloy to be lifted out of the bed after cooling.

A more rapid cooling rate is achieved, for example, by thin layer casting, water-granulation or gas atomization.

Bullón et al. (Infacon X, 2004, 147-154) discloses a process for casting silicon metal in a thin layer (about 1.5 cm) on a water-cooled copper plate. Owing to rapid solidification (about 30 s) the silicon grains formed have an average size of only about 100 µm (300 µm when traditional casting moulds are used).

Brekken et al. (Silicon for the Chemical Industry III, 1996, 33-45) describes a process for water granulation of silicon metal. 78% of the granulate produced is 3-10 mm in size, leading, on account of the resulting cooling rate, to a favorable distribution of the intermetallic phases.

U.S. Pat. No. 4,986,971 A discloses a process for preparing TCS in a fluidized-bed reactor by reaction of Si powder with HCl at a temperature of between 280 and 300° C., wherein the Si powder has been produced by gas atomization of molten silicon and, preferably, has a particle size of from about 1 to about 100 µm.

It has been found that P contamination of mg-Si even in the mid double-digit ppmw range has a negative influence on TCS selectivity. Using mg-Si having a P content greater than 15 ppmw and less than 30 ppmw achieves high TCS selectivity.

Commercially available mg-Si typically comprises 20 to 50 ppmw of phosphorus. Silicon having a low P content (<30 ppmw) can be obtained, for example, by using raw materials low in phosphorus (quartz sand, coal, coke, electrodes) in the preparation of mg-Si. Some of the phosphorus introduced into the furnace exits the furnace with the offgas. To obtain mg-Si very low in P, the proportion of P exiting the furnace with the offgas should be maximized. This can be achieved, for example, by continuous tapping of the furnace.

Optionally, the phosphorus content can also be further reduced after isolation of the silicon, but this is associated with additional costs. The prior art discloses various processes for the subsequent reduction of the phosphorus content of the silicon.

US 20120260850 A1, for example, describes the purification of mg-Si by recrystallization from the oversaturated Al—Si melt (countercurrent cascade mode).

US 2007245854 A1 describes a process wherein $N_2$ and/or $Al_2O_3$ or Al are added to molten mg-Si to form a slag which accumulates P and B present in the mg-Si. The purified molten Si is then separated from the slag.

SUMMARY OF THE INVENTION

It is an object of the invention to provide a process for preparing TCS from mg-Si and HCl with high TCS selectivity even when using mg-Si having a relatively high P content (greater than or equal to 30 ppmw). This and other objects are achieved by a process for preparing trichlorosilane (TCS) by reaction of metallurgical silicon (mg-Si) and HCl, which comprises utilizing mg-Si having a titanium content greater than 0.06 wt %.

DETAILED DESCRIPTION OF THE PREFERRED EMBODIMENTS

It is preferable to use mg-Si having a titanium content greater than or equal to 0.08 wt % and less than or equal to 0.12 wt %. It is particularly preferable to use mg-Si having a phosphorus content greater than or equal to 30 ppmw.

It is preferable to use mg-Si which exhibits a maximum mean thickness of 30 mm or a maximum mean diameter of 15 mm during solidification.

It is preferable to use mg-Si which has been solidified at a rapid cooling rate. Rapidly solidified mg-Si is to be understood as meaning mg-Si which, in particular, has been prepared by thin layer casting (TL), multilayer casting, water granulation (WG) and gas atomization and which exhibits a maximum mean thickness of 30 mm (thin layer Si, multilayer cast Si) or a maximum mean diameter of 15 mm (water granulation, gas atomization) during solidification. It is particularly preferable to use mg-Si which has been prepared by water granulation.

mg-Si is to be understood as meaning silicon having a silicon content of between 95 wt % and 99.8 wt %. The mg-Si used preferably has an Si content greater than 98 wt % and less than or equal to 99.8 wt %.

The reaction is preferably effected at a temperature of from 280 to 400° C., a temperature of from 320 to 380° C. being particularly preferred, and at a pressure of from 0.1 to 30 bar, a pressure of from 1 to 4 bar being particularly preferred.

The inventors have been able to show that P contamination of mg-Si even in the mid double-digit ppmw range (from about 30 ppmw) has a negative influence on TCS selectivity. It is possible to prepare mg-Si having a low phosphorus content (<25 ppmw) in accordance with the state of the art. However, this is associated with additional expense and inconvenience.

It has been found that, surprisingly, the negative influence of phosphorus on TCS selectivity is reduced by using mg-Si having a titanium content greater than 0.06 wt %, preferably greater than or equal to 0.08 wt % and less than or equal to 0.12% and, consequently, high TCS selectivity is achieved with acceptable raw material costs (mg-Si).

mg-Si having a Ti content greater than 0.06 wt % can be prepared by using Ti-rich quartz sand or by addition of Ti-containing compounds into the furnace.

TCS selectivity is further increased when the Ti-rich mg-Si employed has been solidified at a rapid cooling rate.

Preparation of TCS by reaction of HCl and mg-Si having a titanium content greater than 0.06 wt % is preferably effected in a fluidized-bed, stirred-bed or fixed-bed reactor.

The advantages of the invention are more particularly described hereinafter with reference to examples and comparative examples.

Examples and Comparative Examples

The experiments in the following examples were carried out in a laboratory fluidized-bed reactor made of stainless steel.

The titanium and/or phosphorus content of the mg-Si samples tested was determined by X-ray fluorescence analysis (XRFA).

To this end, mg-Si was finely milled (milling time 60 s at 1500 revolutions) in a semi-automatic disk mill (HPM 100 from Herzog).

7 g of finely milled mg-Si and 1.4 g of carnauba wax (binder) were mixed, dried for 3 min at 150° C., comminuted for about 30 s in an agate mortar and pressed into a tablet for 20 s using 35 t of pressure.

The pressed tablet was analyzed in an XRF (X-ray fluorescence) spectrometer.

The XRF spectrometer used was an Axios$^{mAX}$ from PANalytical B.V. having an output of 4 kW, an Rh tube, a 300 μm collimator, an LiF (200) crystal (for Ti analysis) and a Ge(111)c crystal (for P analysis) and a flow detector.

Ti and P contents were measured at the strongest Kα line at a voltage of 40 and 32 Kv respectively and a current of 100 and/or 125 mA respectively.

XRFA results were calibrated by comparison with an independent reference method, namely inductively coupled plasma atomic emission spectroscopy (ICP-OES). The XRFA calibration function was established using a set of 10 Si samples having various Ti and P contents (0.02-0.12 wt % and 23-86 ppm respectively).

ICP-OES was calibrated using commercial standard solutions. The experimental uncertainty (4 σ) associated with the XRFA is 30 ppmw for titanium and 3 ppmw for phosphorus.

Each experiment was conducted by charging 10 g of mg-Si (commercially available, cooled form: fragmentary (FR), thin layer (TL), water granulate (WG), milled and screened to 0-355 μm, Si content 98.4-99.2 wt %, Fe content 0.34-0.75 wt %, Al content 0.19-0.36 wt %, Ca content 0.02-0.13 wt %, Ti content 0.02-0.10 wt %) into the reactor and reacting same with 100 sccm of HCl at a pressure of 1.5 bar (absolute).

The reactor housing was heated to 323° C. and the temperature in the reaction zone was about 360° C. owing to the strong exothermicity of the reaction.

The reaction products were analyzed by mass spectrometry (online gas stream analysis) and gas chromatography (offline condensate analysis).

Mean TCS selectivity was determined at a silicon conversion of 13-38% for each experiment.

Example 1

Sample A, Inventive

An mg-Si sample prepared by rapid cooling (TL) and having a high Ti content (0.062 wt %) and a normal P content (30 ppmw) was reacted with HCl in accordance with the description.

A TCS selectivity of 95.6% was achieved using this sample (A) (see Table 1).

Example 2

Sample B, Inventive

An mg-Si sample prepared by rapid cooling (WG) and having a high Ti content (0.10 wt %) and a high P content (40 ppmw) was reacted with HCl in accordance with the description.

A TCS selectivity of 95.6% was achieved using this sample (B) (see Table 1).

Example 2

Samples C and D, Inventive 2 mg-Si samples prepared by normal cooling (FR) and having a high Ti content (0.082 and 0.10 wt % respectively) and a high P content (39 and 41 ppmw respectively) were reacted with HCl in accordance with the description.

TCS selectivities of 94.5% and 94.0% respectively were achieved using these samples (C and D) (see Table 1).

TABLE 1

| | | examples (inventive): | | | |
|---|---|---|---|---|---|
| Sample | Cooling rate (form) | Ti content (%) | P content (ppm) | Si content (%) | TCS selectivity (%) |
| A | Rapid (TL) | 0.062 | 30 | 98.4 | 95.6 |
| B | Rapid (WG) | 0.096 | 40 | 98.8 | 95.6 |
| C | Normal (FR) | 0.082 | 39 | 99.0 | 94.5 |
| D | Normal (FR) | 0.100 | 41 | 98.7 | 94.0 |

Example 3

Comparative Example

Noninventive (Samples E, F, G and H)

4 mg-Si samples prepared by normal cooling (FR) and having a normal Ti content (0.023-0.032 wt %) were reacted with HCl in accordance with the description. These samples illustrate firstly that, when Ti content is normal, TCS selectivity falls with increasing P content (see Table 2).

Secondly, sample G serves as a comparative example for Ti-rich sample A (normal P content & rapid cooling rate) and sample H serves as a comparative example for Ti-rich sample B (high P content & rapid cooling rate) and for the Ti-rich samples C and D (high P content and normal cooling rate).

It can be seen from this comparison (A vs. G, and B to D vs. H respectively) that (when P contents are similar) the samples having a high Ti content in accordance with the invention (>0.06 wt %) show TCS selectivity 1.8-3.9% higher than the samples having a normal Ti content (<0.04 wt %).

Finally, the samples having a high Ti content, similar (high) P contents and different cooling rates are compared with one another (B vs. C and D).

This shows that the rapidly cooled sample (B) exhibits TCS selectivity 1.1-1.6% higher than the normally cooled samples (C and D).

TABLE 2 comparative examples (noninventive):

| Sample | Cooling rate | Ti content (%) | P content (ppm) | Si content (%) | TCS selectivity (%) |
|---|---|---|---|---|---|
| E | Normal (FR) | 0.023 | 15 | 99.0 | 96.1 |
| F | Normal (FR) | 0.030 | 21 | 99.1 | 95.4 |
| G | Normal (FR) | 0.029 | 29 | 98.7 | 93.8 |
| H | Normal (FR) | 0.032 | 40 | 99.2 | 91.7 |

The invention claimed is:

1. A process for preparing trichlorosilane (TCS), comprising reacting metallurgical silicon (mg-Si) having a titanium content of 0.08 wt % to 0.12 wt. %, and a phosphorus content ≥30 ppmw with HCl.

2. The process of claim 1, wherein the mg-Si has a phosphorus content between 30 ppmw and 50 ppmw.

3. The process of claim 1, wherein the mg-Si has a phosphorus content greater than or equal to 30 ppmw and less than or equal to 41 ppmw.

4. The process of claim 1, wherein the mg-Si is prepared by solidification from a melt of mg-Si, and exhibits a maximum mean thickness of 30 mm or a maximum mean diameter of 15 mm immediately following solidification.

5. The process of claim 2, wherein the mg-Si is prepared by solidification from a melt of mg-Si, and exhibits a maximum mean thickness of 30 mm or a maximum mean diameter of 15 mm immediately following solidification.

6. The process of claim 3, wherein the mg-Si is prepared by solidification from a melt of mg-Si, and exhibits a maximum mean thickness of 30 mm or a maximum mean diameter of 15 mm immediately following solidification.

7. The process of claim 4, wherein the mg-Si has been prepared by water granulation.

8. The process as claimed of claim 1, wherein the mg-Si has an Si content greater than 98 wt %.

9. The process of claim 1, wherein reacting is effected at a temperature of from 280 to 400° C.

10. The process of claim 1, wherein reacting is effected at a temperature of from 320 to 380° C.

11. The process of claim 1, wherein reacting is effected at a pressure of from 0.1 to 30 bar.

12. The process of claim 9, wherein reacting is effected at a pressure of from 0.1 to 30 bar.

13. The process of claim 1, wherein reacting is effected at a pressure of from 1 to 4 bar.

14. The process of claim 9, wherein reacting is effected at a pressure of from 1 to 4 bar.

15. A process for preparing trichlorosilane (TCS), comprising reacting metallurgical silicon (mg-Si) having a titanium content of 0.06 wt % to 0.12 wt. %, and a phosphorus content ≥30 ppmw with HCl, wherein the mg-Si is prepared by solidification from a melt of mg-Si, and exhibits a maximum mean thickness of 30 mm or a maximum mean diameter of 15 mm immediately following solidification.

16. The process of claim 15, wherein the mg-Si has been prepared by water granulation.

* * * * *